United States Patent [19]

Ishikawa

[11] Patent Number: 5,297,028
[45] Date of Patent: Mar. 22, 1994

[54] METHOD AND APPARATUS FOR CORRECTING DRIFT ERRORS IN AN ANGULAR RATE SENSOR

[75] Inventor: Masataka Ishikawa, San Jose, Calif.
[73] Assignee: Zexel Corporation Daihatsu-Nissan, Tokyo, Japan
[21] Appl. No.: 750,655
[22] Filed: Aug. 27, 1991
[51] Int. Cl.⁵ .................... G01P 21/00; G01P 3/00
[52] U.S. Cl. ................... 364/571.03; 364/565; 73/497
[58] Field of Search ............ 364/571.01–571.07, 364/556, 557, 454, 457, 565, 499, 453; 74/5.46; 73/1 E, 497, 504, 1 D, 2

[56] References Cited

U.S. PATENT DOCUMENTS 4,593,359  6/1986  Sadeh ................ 364/571.04
4,651,576  3/1987  Luke ..................... 74/5.46
4,914,611  4/1990  Yamanaka et al. ........ 364/557 X Primary Examiner—Jack B. Harvey
Assistant Examiner—Melanie A. Kemper
Attorney, Agent, or Firm—Thomas R. Morrison

[57] ABSTRACT

An angular rate sensor for a vehicle navigation system stores an environmental temperature and a related null voltage each time the vehicle stops. The pairs of data points are stored in a non-volatile look-up table for use during vehicle motion. During vehicle motion, the environmental temperature is measured, and a null voltage is selected from the look-up table corresponding to the measured temperature. The null voltage is used to correct drift offset. Interpolation is used when data keyed to the measured temperature cannot be found in the look-up table.

4 Claims, 3 Drawing Sheets

METHOD AND APPARATUS FOR CORRECTING DRIFT ERRORS IN AN ANGULAR RATE SENSOR

BACKGROUND OF THE INVENTION

The present invention relates to angular rate sensors and, more particularly, to an angular rate sensor for a vehicle.

Angular rate sensors are useful in vehicle navigation to detect an angular rate of the vehicle body. When the angular rate is integrated, the body angle of the vehicle, with respect to an arbitrary starting body angle, can be calculated.

An angular rate sensor generally relies on a gyro for sensing a change in the body angle of the vehicle on which it is mounted. The inventors have discovered that a drift error of the gyro of an angular rate sensor is temperature sensitive. Due to the temperature sensitivity, if the environmental temperature to which the gyro is exposed changes during use, an unknown drift error is produced. This unknown drift error, which accumulates over time, limits the accuracy of angular rate sensors.

In high-cost systems, a gyro angular rate sensor is mounted in an oven whose temperature is carefully controlled to a fraction of a degree by an automatic temperature control system. The high cost of such a technique forbids its use in low-cost systems such as are required to serve as part of the navigation systems of automobiles and trucks.

An angular rate sensor may be calibrated while the vehicle is stationary by noting the null voltage produced. In Japanese laid-open utility model publication 2-194314, a gyro angular rate sensor calculates a drift compensation factor by noting the null voltage every time the vehicle stops. This drift compensation factor is then used to compensate for drift while the vehicle is moving.

Although the foregoing drift compensation system may be effective to compensate for drift during short episodes of vehicle motion, on a long continuous trip, drift errors grow to serious amounts. In addition, a motor vehicle, and a gyro within it, is exposed to large temperature changes. For example, during cold-weather travel, the temperature in passenger spaces can change by many tens of degrees due to heater operation. In hot-weather travel, the temperature can similarly change due to solar insolation, convective heating and cooling, and air conditioner use. Accordingly, the drift compensation system according to the above utility model suffers serious errors.

OBJECTS AND SUMMARY OF THE INVENTION

It is an object of the invention to provide a compensation technique for an angular rate sensor that overcomes the drawbacks of the prior art.

It is further object of the invention to provide a compensation technique for an angular rate sensor that responds to temperature changes during episodes of vehicle motion.

It is a further object of the invention to provide a compensation technique for an angular rate sensor that stores values of a null voltage and a temperature each time a vehicle is stopped, and then uses the stored values to compensate for drift while the vehicle moves.

It is a still further object of the invention to provide a compensation technique for an angular rate sensor that employs a look-up table of null voltages and corresponding temperatures, and that uses the look-up table to determine appropriate drift compensations during vehicle motion.

Briefly stated, the present invention provides an angular rate sensor for a vehicle navigation system which stores an environmental temperature and a related null voltage each time the vehicle stops. The pairs of data points are stored in a non-volatile look-up table for use during vehicle motion. During vehicle motion, the environmental temperature is measured, and null voltage is selected from the look-up table corresponding to the measured temperature. The null voltage is used to correct drift offset. Interpolation is used when data keyed to the measured temperature cannot be found in the look-up table.

According to an embodiment of the invention, there is provided an angular rate sensor for a vehicle comprising: means for measuring an angular rate, means for measuring a temperature, means, effective when the vehicle is stopped, for measuring a null voltage of the means for measuring an angular rate, table means for storing the null voltage, together with a measurement of temperature at the time the null voltage is stored, and means, effective during motion of the vehicle, for compensating an output of the means for measuring an angular rate with a null voltage from the table means corresponding to a temperature existing at a time of the compensating.

According to a feature of the invention, there is provided a method for measuring an angular rate of a vehicle comprising: measuring an angular rate, measuring a temperature, when the vehicle is stopped, measuring a null voltage of a means for measuring an angular rate, storing the null voltage, together with a measurement of temperature at the time the null voltage is stored, and during motion of the vehicle, compensating an output of the means for measuring an angular rate with a stored null voltage corresponding to a temperature existing at a time of the compensating.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
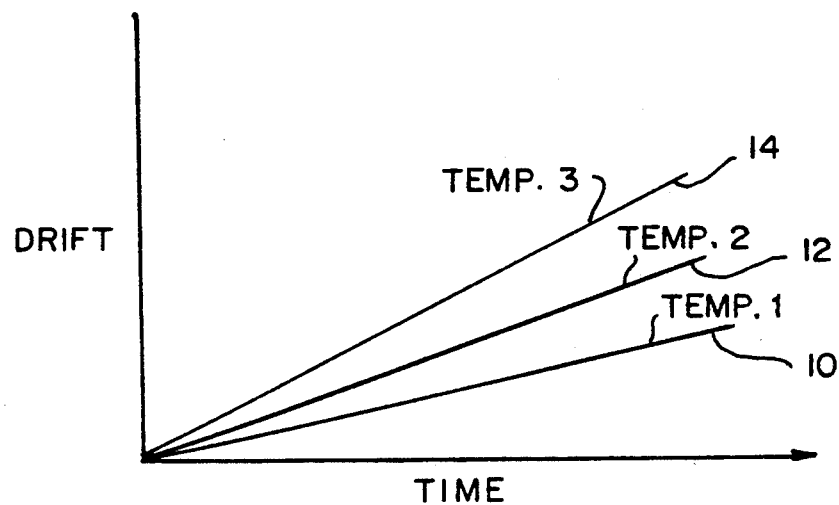
FIG. 1 is a set of curves relating drift to time at several different temperatures.

Referring first to FIG. 1, a gyro drift at a first temperature TEMP. 1 is indicated in a straight line 10. This indicates that, with the passage of time, the drift increases linearly with increasing time. In some systems, the drift may increase non-linearly along, for example, an exponential curve. As noted, straight line 10 defines gyro drift at a single temperature. At other temperatures such as, for example, second and third temperatures TEMP. 2 and TEMP. 3, respectively, the drifts increase along different slopes, as shown in straight lines 12 and 14, respectively. With this information, it would be clear that, if a calculation of drift is made based on a temperature TEMP. 1 when, in fact, the temperature is TEMP. 3, a substantial uncompensated drift will occur, possibly resulting in measurement accuracy outside the bounds of allowable errors.

In addition to the problems of temperature-related drift, a systematic change in drift relationships can occur as an angular rate sensor ages. Thus, even if the gyro environment remains at the same temperature such as, for example, TEMP. 1, in time, straight line 10 no longer represents the true relationship between temperature and drift. Accordingly, an attempt to compensate drift using straight line 10 results in an uncompensated error. In the above-referenced Japanese Utility Model publication, the longer the time between vehicle stoppings, at which actual values of null voltages can be measured, the greater are the uncompensated errors that build up during travel.

Figure 2:
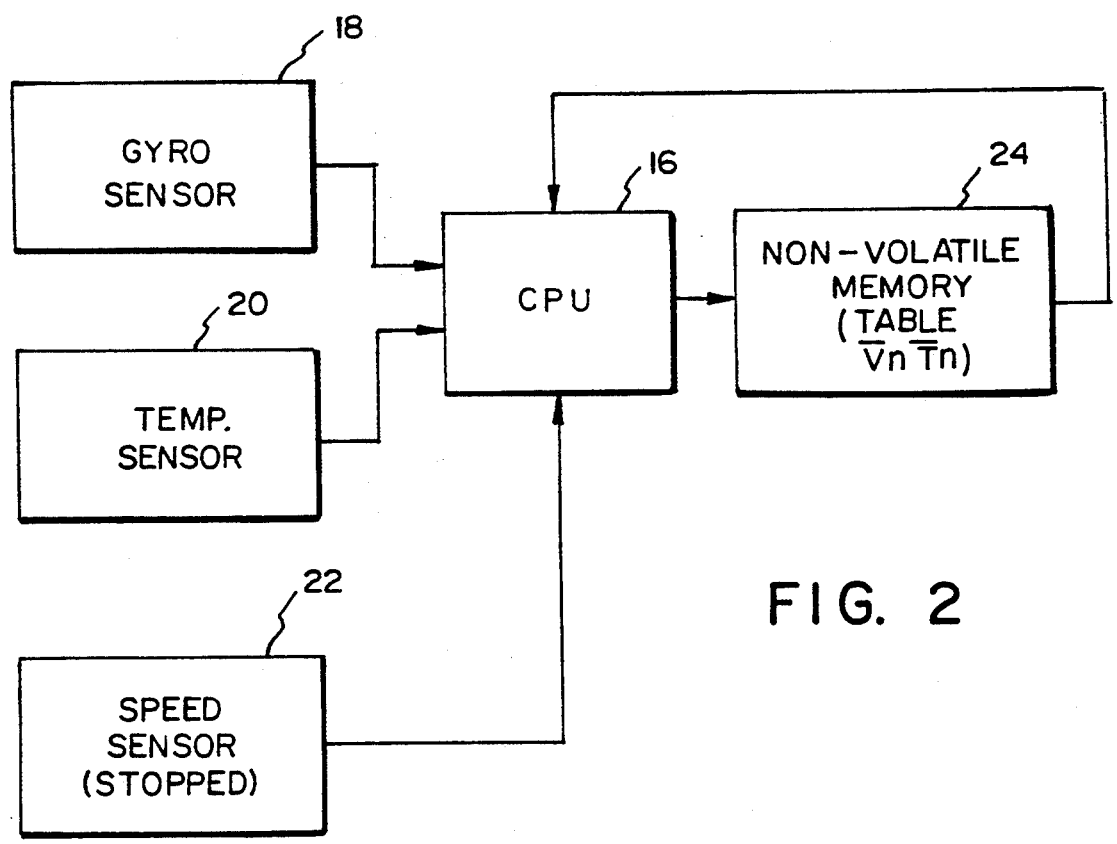
FIG. 2 is a block diagram of an angular rate system according to an embodiment of the invention.

Referring now to FIG. 2, a CPU 16 receives an output of a gyro sensor 18 and a temperature sensor 20. Normally, outputs of gyro sensor 18 and temperature sensor 20 are analog quantities, but for simple presentation of the invention, the presence of conventional analog-to-digital conversion devices within the sensors is presumed in order that the inputs to CPU 16 are digital representations of the measured quantities.

Conventional vehicle speed sensor 22 also provides an input to CPU 16. Vehicle speed sensor 22 provides a signal indicating whether the vehicle carrying the apparatus of the present invention is stopped or moving. CPU 16 provides an output to a non-volatile memory 24. Non-volatile memory 24 feeds back an input to CPU 16.

Vehicle speed sensor 22 may be any conventional device such as, for example, a velocity detector of a type commonly used with anti-skid braking systems (ABS). Stoppage of the vehicle is sensed when there is an absence of output from the velocity detector. Some velocity detectors are relatively insensitive at very low speeds. Thus, a different type of vehicle speed sensor 22 may be required. For example, a permanent magnet (not shown) may be mounted for rotation with one of the wheels (not shown) to the vehicle. An electric coil (not shown) may be stationarily mounted on the vehicle body within the magnetic influence of the magnet. As the magnet rotates past the electric coil, its influence changes an electrical characteristic of the coil. The electrical characteristic may be, for example, the impedance or reluctance of the coil which can be sensed by conventional electrical sensing devices in speed sensor 22. Alternatively, the passage of the magnet may induce a voltage in the coil which can be sensed by the remainder of the apparatus. In this type of device, a pulse signal is developed each time the magnet passes the coil. The periodic occurrence of the pulse signal is an indication that the vehicle continues to move. When the vehicle stops, the pulse signal stops occurring. This is taken as an indication of stoppage of the vehicle.

In operation, when vehicle speed sensor 22 indicates that the vehicle is stopped, CPU 16 stores a pair of values, representing the present values of the temperature and the null voltage, in a storage location in non-volatile memory 24 to create one data pair in a look-up table. When the vehicle moves again, then stops, CPU 16 stores a further pair of values, representing the then present values of the temperature and null voltage, in non-volatile memory 24. While the vehicle is in motion, CPU 16 continuously draws from non-volatile memory 24 a stored value of null voltage that is associated in the look-up table with the present sensed temperature sensed by temperature sensor 20. With this information, CPU 16 corrects the output of gyro sensor 18 using a predicted null voltage always related to the actual temperature being experienced by gyro sensor 18.

Figure 3:
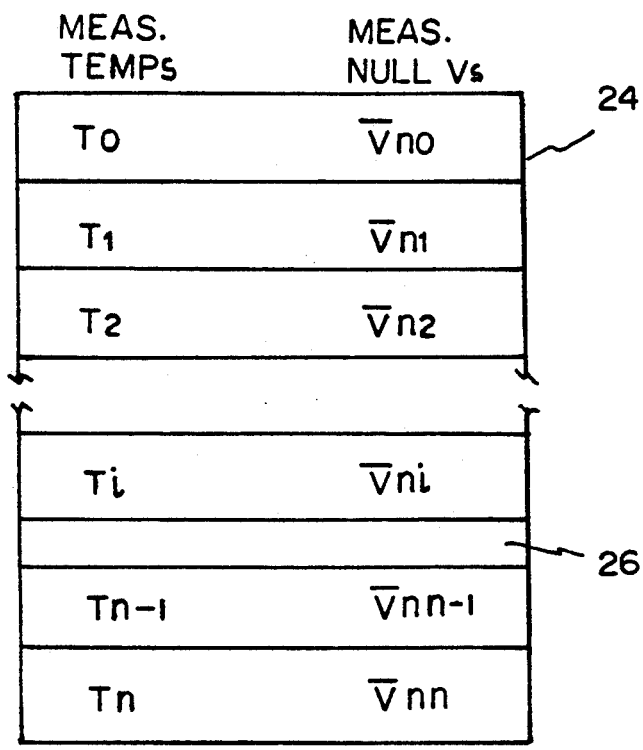
FIG. 3 is a table representing storage locations in a look-up table of the present invention.

Referring to FIG. 3, the contents of memory locations in non-volatile memory 24 are represented by a measured temperature and its related measured null voltage. The memory locations are arranged in ascending order of temperature Tx. For example, a measured temperature $T_0$ is stored in memory location 0 together with its associated null voltage $\overline{V}_{no}$.

It may occur that a memory location such as, for example, memory location 26 may be vacant because a temperature appropriate for storage therein has not yet been encountered by the system, and therefore no stored value is available. In this event, the value of null voltage for the existing measured temperature can be estimated by interpolation.

Figure 4:
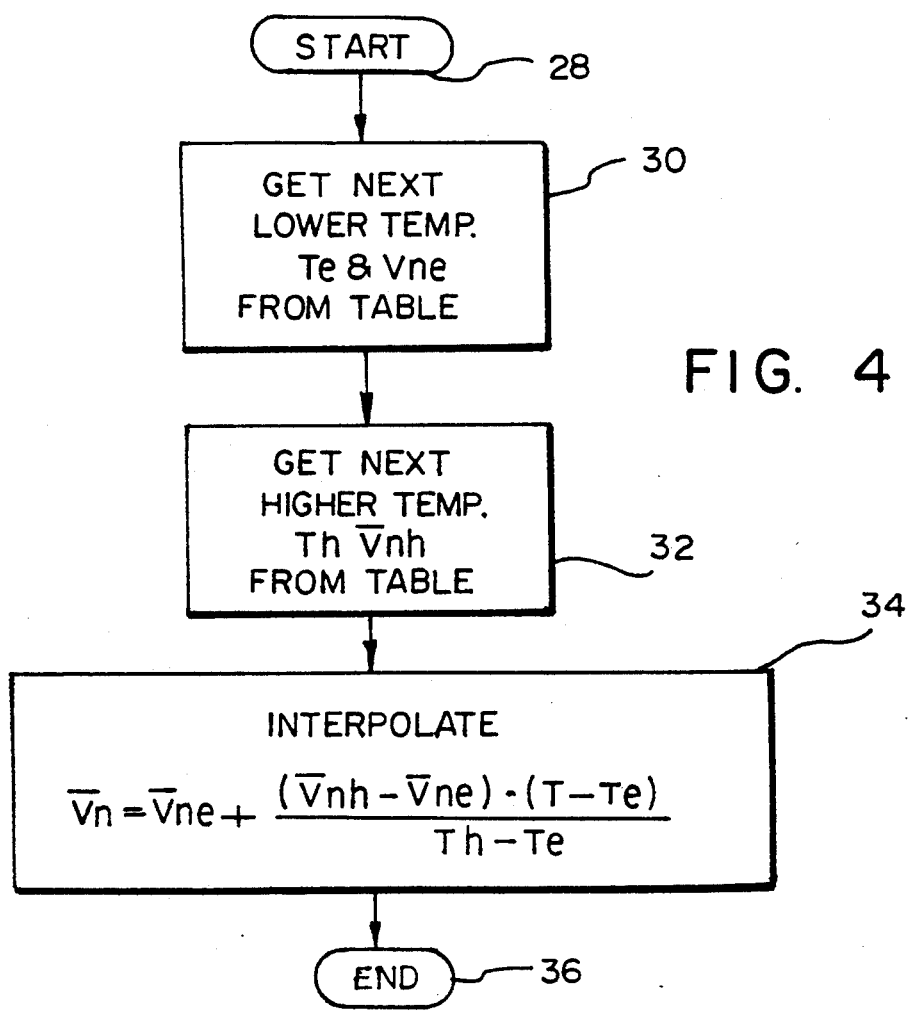
FIG. 4 is a flow diagram of an interpolation routine useable in the angular rate system of FIG. 2.

Referring to FIG. 4, an interpolation routine suitable for use in CPU 16 is shown. If a measured temperature is missing from the look-up table, a first pair of related stored values corresponding to the next lower temperature from the measured temperature is obtained in box 30, and a second pair of related stored values corresponding to the next higher temperature from the measured the temperature are secured in box 32. These values are used to interpolate between the two pairs of values to find a close approximation of the value of null voltage that would be appropriate for the measured temperature, based on two neighboring pairs of values stored during previous stops of the vehicle.

Figure 5:
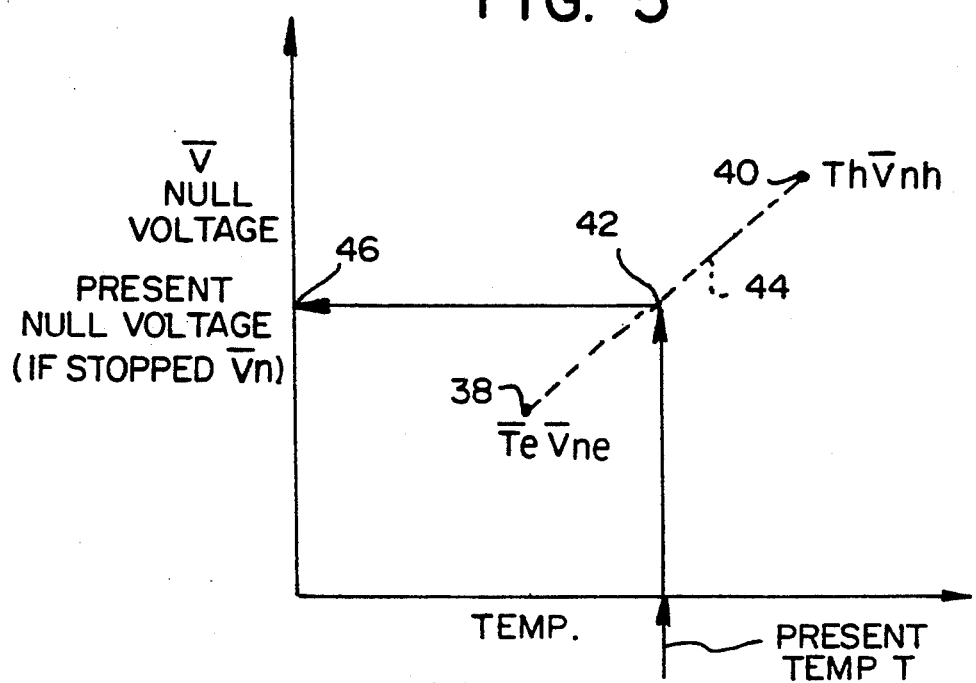
FIG. 5 is a diagram to which reference will be made in describing interpolation.

The process is illustrated in FIG. 5. A lower-temperature point 38 and a higher-temperature point 40 represent memory locations containing the nearest pairs of data values to a present-temperature point 42 whose null voltage has not been measured. On the assumption that the null voltage is linearly related to temperature, present-temperature point 42 lies on a dashed line 44 connecting points 38 and 40. Thus, by finding present-temperature point 42 on dashed line 44, a corresponding calculated present null voltage 46 is found on the ordinate axis.

The calculated present null voltage 46 is then used by CPU 16 (FIG. 2) to compensate for drift errors in the present output of gyro sensor 18. In this way, an accurate representation of the vehicle body position is calculated and maintained in CPU 16, even over a long period of motion without intermediate stops, and during which gyro sensor 18 is exposed to changing temperature.

Figure 6:
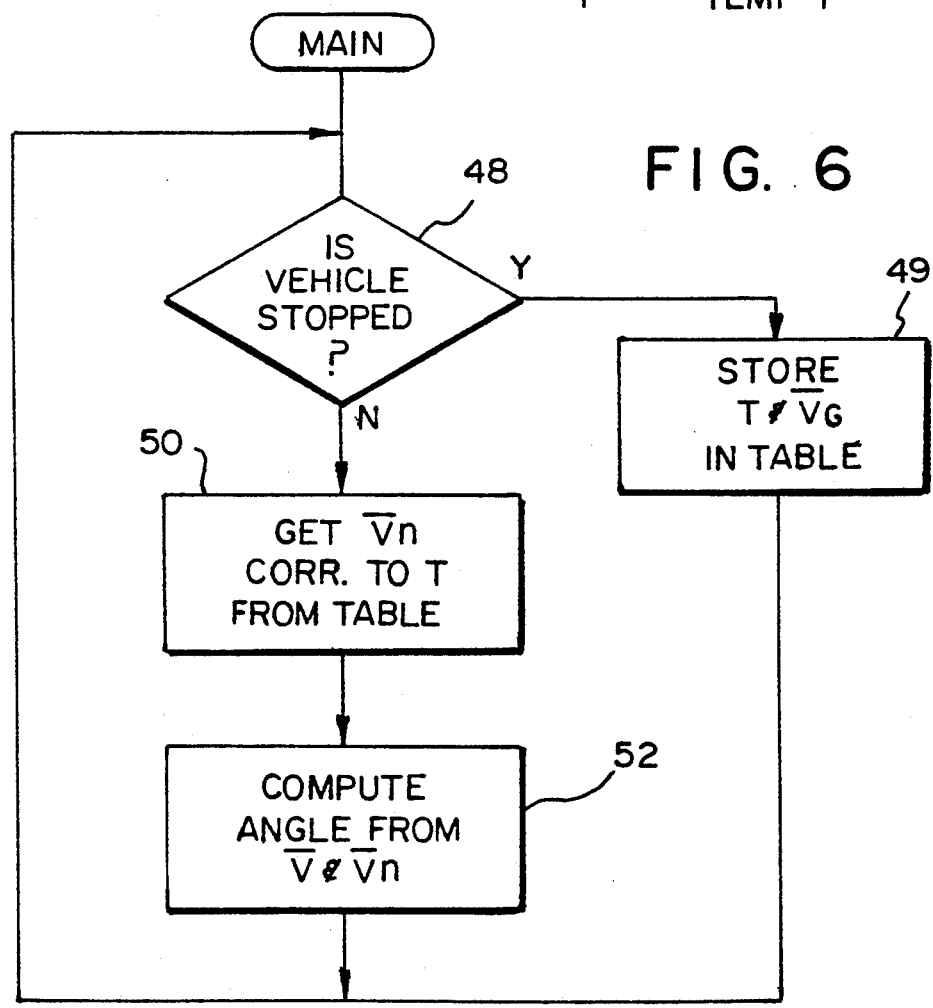
FIG. 6 is a flow diagram of the main routing for computing an angular rate.

Referring now to FIG. 6, a brief routine illustrates the main program. A decision box 48 directs a signal to a table store command box 49 if the vehicle is stopped. In the stopped condition, table store command box 49 effects the storage of the present temperature and the present null voltage in non-volatile memory 24 (FIG. 2). When the vehicle is not stopped, decision box 48 directs a signal to a get-stored-values box 50 to look up the null voltage corresponding to the present temperature, if these values are stored, or to interpolate to a calculated value of null voltage, using the procedure illustrated in FIG. 4, if values for the present temperature have not been stored. Using the looked-up or interpolated null voltage value $\overline{V}_n$ and the present output $\overline{V}$ of gyro sensor 18, a compute angle box 52 computes present vehicle body angle corrected for gyro drift.

The contents of non-volatile memory 24 may be flushed periodically to make way for newer measurements, or values measured every time the vehicle is stopped may remain in non-volatile memory indefinitely, until overwritten with new values. The temperatures used as keys for memory locations in non-volatile memory 24 may be predetermined values. For example, table address 50 may be established to relate to a temperature between 70 and 71 degrees. If the system measures a temperature in this range while the vehicle is stopped, it stores the corresponding null voltage in table address 50. Until the system experiences a temperature in this range while the vehicle is stopped, table address 50 remains empty (contains a zero). In that event, interpolation, as previously described, is performed when a temperature in this range is measured while the vehicle is in motion.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An angular rate sensor for a vehicle comprising:
   means for measuring an angular rate;
   means for measuring a temperature related to an environmental temperature to which said angular rate sensor is exposed;
   means, effective when said vehicle is stopped, for measuring a null voltage of said means for measuring an angular rate;
   said null voltage being an output voltage, of said means for measuring an angular rate, when said vehicle is stopped;
   table means for storing a plurality of said null voltages together with corresponding measurements of a plurality of said environmental temperatures made at the time said null voltages are stored; and
   means, effective during motion of said vehicle, for compensating an output of said means for measuring an angular rate with a null voltage from said table means corresponding to an environmental temperature measured at a time of said compensating.

2. Apparatus according to claim 1, wherein said means for compensating includes means for interpolating a present null voltage based on at least two stored measurements of temperature and null voltage.

3. Apparatus according to claim 1, wherein said means for measuring an angular rate includes a gyro.

4. A method for measuring an angular rate of a vehicle comprising:
   measuring an angular rate;
   measuring a temperature related to an environmental temperature to which said sensor is exposed;
   when said vehicle is stopped, measuring a null voltage of a means for measuring an angular rate;
   said null voltage being an output voltage, of said means for measuring an angular rate, when said vehicle is stopped;
   storing a plurality of said null voltages, together with corresponding measurements of a plurality of environmental temperatures to which said means for measuring angular rate is exposed at the time said null voltages are stored; and
   during motion of said vehicle, compensating an output of said means for measuring an angular rate with a stored null voltage corresponding to an environmental temperature measured at a time of said compensating.

* * * * *